United States Patent
Jacobson (10) Patent No.: US 8,050,866 B2
(45) Date of Patent: Nov. 1, 2011

(54) PULSED-NEUTRON FORMATION DENSITY

(75) Inventor: Larry A Jacobson, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 715 days.

(21) Appl. No.: 11/467,692

(22) Filed: Aug. 28, 2006

(65) Prior Publication Data

US 2006/0284066 A1    Dec. 21, 2006

Related U.S. Application Data (63) Continuation-in-part of application No. 10/671,351, filed on Sep. 25, 2003, now Pat. No. 7,117,092.

(51) Int. Cl.
*G01V 1/40* (2006.01)
(52) U.S. Cl. .......................................................... 702/8
(58) Field of Classification Search .................... None
See application file for complete search history.

(56) References Cited

U.S. PATENT DOCUMENTS

| | | | |
|---|---|---|---|
| 3,946,226 A | 3/1976 | Smith, Jr. | |
| 4,055,763 A | 10/1977 | Antkiw | |
| 4,122,339 A | 10/1978 | Smith, Jr. et al. | |
| 4,122,340 A | 10/1978 | Smith, Jr. et al. | |
| 4,239,965 A | 12/1980 | Oliver et al. | |
| 4,297,575 A | 10/1981 | Smith, Jr. et al. | |
| 4,387,302 A * | 6/1983 | Givens | 250/269.2 |
| 4,430,567 A | 2/1984 | Oliver et al. | |
| 4,605,854 A * | 8/1986 | Smith, Jr. | 250/266 |
| 4,645,926 A * | 2/1987 | Randall | 250/256 |
| 4,656,354 A | 4/1987 | Randall | |
| 4,972,082 A | 11/1990 | Loomis | |
| 5,105,080 A * | 4/1992 | Stoller et al. | 250/269.7 |
| 5,374,823 A | 12/1994 | Odom | |
| 5,525,797 A | 6/1996 | Moake | |
| 5,608,215 A | 3/1997 | Evans | |
| 5,825,024 A | 10/1998 | Badruzzaman | |
| 5,900,627 A * | 5/1999 | Odom et al. | 250/269.7 |
| 6,289,283 B1 | 9/2001 | Plasek | |
| 6,376,838 B1 * | 4/2002 | Odom | 250/269.6 |
| 6,754,586 B1 | 6/2004 | Adolph et al. | |
| 2003/0178560 A1 | 9/2003 | Odom et al. | |
| 2006/0226351 A1 * | 10/2006 | Stoller et al. | 250/269.1 |

FOREIGN PATENT DOCUMENTS

EP        0552073 B1      7/1993

OTHER PUBLICATIONS

Streeter, R.W. et al., "Cased Hole Exploration: Modem Pulsed Neutron Techniques for Locating By-Passed Hydrocarbons in Old Wells," SPE 35162, SPE Permian Basin Oil & Gas Recovery Conference, Mar. 27-29, 1996, pp. 167-176, Midland, Texas.

(Continued)

*Primary Examiner* — Aditya Bhat
(74) *Attorney, Agent, or Firm* — Mark E. Scott; Conley Rose, P.C.

(57) ABSTRACT

A method and related system of determining formation density by compensating actual inelastic gamma rays detected from a pulsed-neutron tool for the effects of neutron transport. The method and systems may model response of the tool and use the modeled response as an indication of an amount to compensate detected inelastic gamma rays.

5 Claims, 10 Drawing Sheets

OTHER PUBLICATIONS

Anonymous, "Log Interpretation Charts," Dresser Atlas, Dresser Industries, Inc., USA, Jun. 1983, 2 pages.

Tittman, J. et al., "The Physical Foundations of Formation Density Logging (Gamma Gamma)," Goephysics, vol. XXX, No. 2, Apr. 1965, pp. 284-293.

Odom, Richard C. et al., "A New 1.625" Diameter Pulsed Neutron Capture and Inelastic/Capture Spectral Combination System Provides Answers in Complex Reservoirs," SPWLA 35th Annual Logging Symposium, Jun. 1994, 19 pages.

Odom, Richard C., Program and Pertinent Slides From A Presentation by Richard C. Odom at SIAM Symposium on Inverse Problems: Geophysical Applications, Dec. 17, 1995, 5 pages.

Randall, Russel R. et al., "PDK-100 Log Examples in The Gulf Coast," 26th Annual SPWL Logging Symposium, Jun. 17-20, 1985, 25 pages.

Randall, Russel R. et al., "PDK-100 Enhances Interpretation Capabilities for Pulsed Neutron Capture Logs," 27th Annual SPWL Logging Symposium, Jun. 9-13, 1986, 16 pages.

Wilson, Robert D., et al., "Bulk Density Logging With High-Energy Gammas Produced by Fast Neutron Reactions With Formation Oxygen Atoms," IEEE Nuclear Science Symposium and Medical Imaging Conference Record, vol. 1, Oct. 21-28, 1995, 7 pages.

Schnieder, B.D., et al., "Using Pulsed Neutron Decay-Spectrum Data and Multi-Inflatable Packer Plugdown Assemblies Improve Oil Production Rates in a Mature CO2 Flood," SPE 35165, SPE Permian Basin Oil & Gas Recovery Conference, Mar. 27-29, 1996, pp. 203-209, Midland, Texas.

Odom, R.C. et al., "Applications and Derivation of a New Cased-Hole Density Porosity in Shaly Sands," SPE 38699, SPE Annual Technical Conference and Exhibition, Oct. 5-8, 1997, pp. 475-487, San Antonio, Texas.

Odom, R.C. et al., "Shaly Sand Analysis Using Density-Neutron Porosities From a Cased-Hole Pulsed Neutron System," SPE 55641, SPE Rocky Mountain Regional Meeting, May 15-18, 1999, 10 pages, Gillette, Wyoming.

Odom, R.C. et al., "A Pulsed Neutron Analysis Model for Carbon Dioxide Floods: Application to the Reinecke Field, West Texas," SPE 59717, SPE Permian Basin Oil & Gas Recovery Conference, Mar. 21-23, 2000, 4 pages, Midland, Texas.

Odom, R.C. et al., "Examples of Cased Reservoir Analysis in the Venture Basin, California," SPE 62850 SPE/AAPG Western Regional Meeting, Jun. 19-23, 2000, 7 pages, Long Beach, California.

Odom, R.C. et al., "Assessing the Capabilities of a Cased-Hole Reservoir Analysis System in the Gulf of Thailand," SPE 64404, SPE Asia Pacific Oil and Gas Conference and Exhibition, Oct. 16-18, 2000, 10 pages, Brisbane, Australia.

Odom, R.C. et al., "Log Examples With a Prototype Three-Detector Pulsed-Neutron System for Measurement of Cased-Hole Neutron and Density Porosities," SPE 71042, SPE Rocky Mountain Petroleum Technology Conference, May 21-23, 2001, Keystone, Colorado, 10 pages.

Odom, R.C. et al., "Improvements in a Through-Casing Pulsed-Neutron Density Log," SPE 71742, SPE Annual Technical Conference and Exhibition, Sep. 30-Oct. 3, 2001, New Orleans, Louisiana, 9 pages.

SPE 56847; "An Investigation of Density Derived from Pulsed Neutron Capture Measurements," C. H. Neuman; 1999, Society of Petroleum Engineers, Inc., 8 pages.

International Search Report for International Application No. PCT/US 2007/072502 dated Feb. 25, 2008, 2pp.

* cited by examiner

PULSED-NEUTRON FORMATION DENSITY

CROSS-REFERENCE TO RELATED APPLICATIONS

This specification is a continuation-in-part of application Ser. No. 10/671,351, filed Sep. 25, 2003, titled "Pulsed-Neutron Formation Density", now U.S. Pat. No. 7,117,092, which application is incorporated by reference herein as if reproduced in full below.

BACKGROUND OF THE INVENTION

1. Field of the Invention

Embodiments of the invention are directed to pulsed-neutron density logging tools. More particularly, embodiments of the invention are directed to pulsed-neutron density logging tools that compensate for neutron transport effects.

2. Background of the Invention

Pulsed-neutron logging tools may be used in cased boreholes, and in some situations pulsed-neutron logging tools may be operated within production tubing. Pulsed-neutron logging tools operate on the principle of releasing high energy neutrons, on the order of 14 Mega electron Volts (MeV) into the formation. The high energy neutrons inelastically collide with other particles and thereby create gamma rays (known as inelastic gamma rays). Some of the inelastic gamma rays created by the collisions make their way back to, and are detected by, gamma ray detectors on the logging tool. The ratio of received gamma rays between a detector close to the pulsed-neutron source (the near detector) and a detector at some distance from the pulsed-neutron source (the far detector) may be indicative of the bulk density of the formation surrounding the borehole.

As neutrons lose energy through inelastic collisions (and the creation of inelastic gamma rays), they eventually reach an energy of thermal equilibrium, approximately 0.025 electron Volts (eV). When the neutrons approach this thermal equilibrium energy, they may be captured by surrounding atoms, and in the capture process a gamma ray may be produced (known as a thermal capture gamma ray). Thermal capture gamma rays too may propagate to the detectors on the tool.

When using a pulsed-neutron logging tool as a bulk density measurement device, inelastic gamma rays carry most of the information as to the formation bulk density. Thus, to determine a formation bulk density using a pulsed-neutron tool, it may be desirable to remove from the total received gamma rays the thermal capture gamma rays to be left only with inelastic gamma rays.

However, even after removing the thermal capture gamma rays from the total received gamma rays, bulk density measurements made with a pulsed-neutron logging tool may not closely match actual bulk density.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or mechanical connection, as the context may require. Thus, if a first device couples to a second device, that connection may be through a direct connection, or through an indirect connection via other devices and connections.

DETAILED DESCRIPTION OF THE PREFERRED EMBODIMENTS

Figure 1:
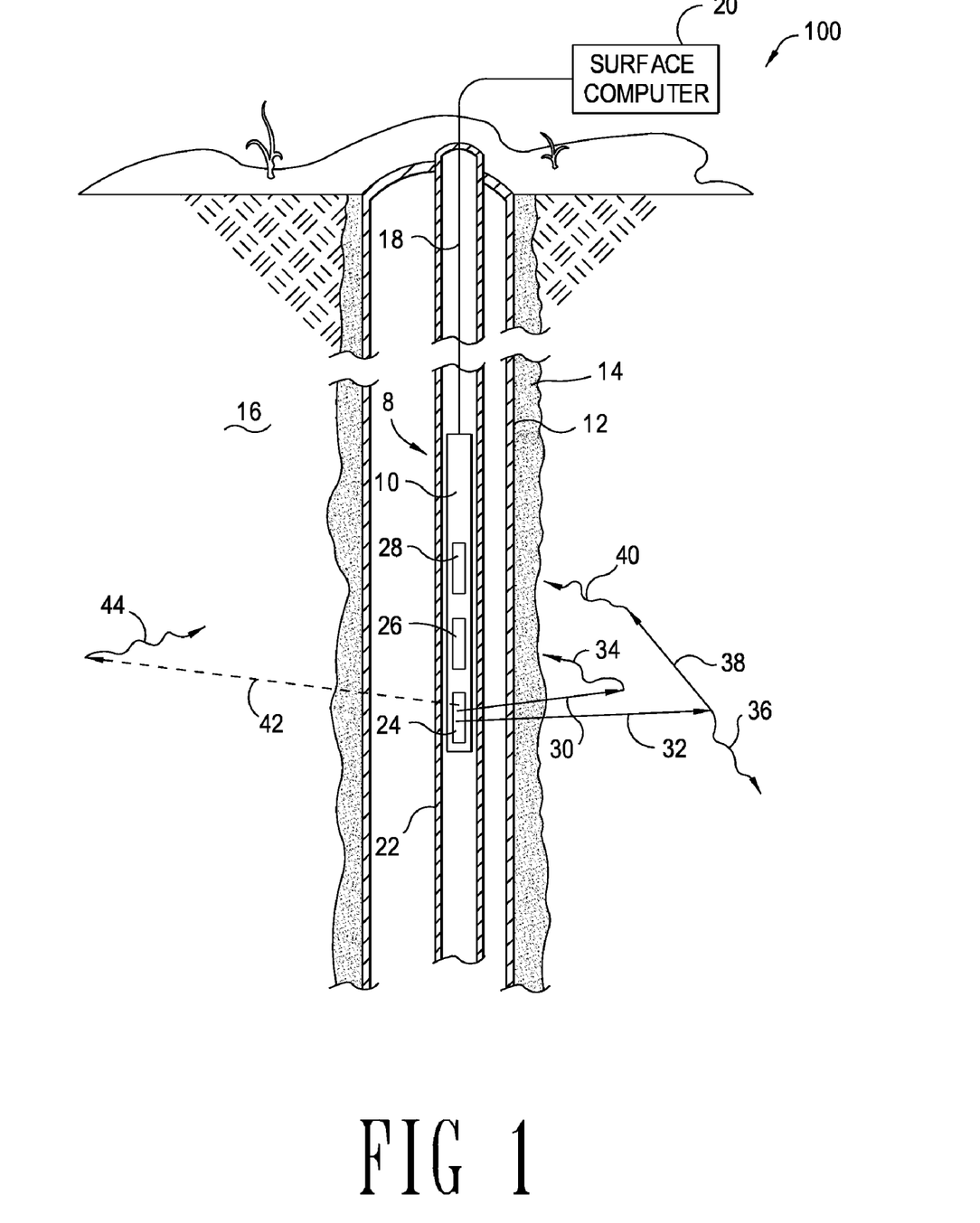
FIG. 1 illustrates a logging system constructed in accordance with embodiments of the invention.

FIG. 1 illustrates a logging system constructed in accordance with at least some embodiments of the invention. In particular, a logging tool 8 may comprise a tool body or sonde 10, placed within a well casing 12 of a borehole. The well casing 12 may have cement 14 between its outer diameter and the formation 16, and the borehole may be referred to as a cased borehole. While some embodiments of the invention are directed to systems for making bulk density measurements (hereinafter just "density") in cased boreholes, the description in relation to a cased borehole should not be construed as limiting the embodiments of the invention to only systems operating in a cased borehole environment. The sonde 10 may be suspended within the borehole by an armored multi-conductor cable 18. The cable 18 may not only provide support for the sonde 10, but also may couple a surface computer 20 to various gamma ray detectors and neutron sources (discussed more fully below). The sonde 10 may also be raised and lowered within the borehole by way of the armored multi-conductor cable 18.

A cased borehole may also comprise production tubing 22. The production tubing 22 is of smaller diameter than the casing 12, and may be the route by which hydrocarbons extracted from the formation are conveyed to the surface. In accordance with at least some embodiments of the invention, the logging tool 8 may be placed within the production tubing 22, as illustrated in FIG. 1; however, placement of the logging tool 8 within the production tubing 22 is not required as the logging tool 8 may be equivalently placed within the casing 12 alone, or in an uncased borehole (not specifically shown). Because production tubing may be relatively small in relation to the casing inside diameter, the logging tool 8 may have a diameter slightly smaller than the internal diameter of the production tubing 22. For example, logging tool 8 may have a diameter of 1.6875 inches.

In accordance with at least some embodiments of the invention, the logging tool 8 may comprise a neutron source 24 mounted to and/or within the sonde 10. The neutron source 24 is preferably capable of producing high energy neutrons (e.g. neutrons having energies of approximately 14 MeV), and may be any currently available or after develop source of neutrons such as a chemical neutron source or a neutron generating device. The neutron source 24 may be capable of producing neutrons in a pulsed fashion, possibly on command from the surface computer 20. Any neutron source producing neutrons with sufficient energy and having a requisite size may be used. The logging tool 8 may also comprise detectors 26, 28 mounted to and/or within the sonde 10. As illustrated, detector 26 may be relatively close to the neutron source 24, and therefore may be referred to as the "near detector." Likewise, detector 28 may be spaced away from the source 24, and therefore may be referred to as the "far detector." In accordance with at least some embodiments of the invention, the near detector 26 may be approximately one foot from the source 24, and the far detector 28 may be approximately two to three feet from the source 24.

Neutron source 24 may generate neutrons having high energy, and the neutrons may interact with particles forming the production tubing 22, casing 12, cement 14, and/or formation 16 to produce gamma rays having varying energies. Thus, detectors 26 and 28 are preferably scintillation detectors capable of detecting the presence of gamma rays, and also detecting energy of received gamma rays. Any suitable scintillation detector may be used. Thus, sonde 10, neutron source 24 and detectors 26, 28 may form the pulsed-neutron logging tool 8.

As alluded to in the Background section, high energy neutrons may interact and/or collide with other particles, and the collision process creates gamma rays. FIG. 1 illustrates this process. In particular, arrows 30 and 32 illustrate high energy neutrons leaving the neutron source 24. As the neutrons inelastically collide with other particles, gamma rays may be produced. In the case of a neutron illustrated by line 30, gamma ray 34 produced by the illustrated inelastic collision may proceed directly back to one of detectors 26, 28. In some cases, gamma ray 34 may interact with other particles, and the interaction may create a different gamma ray that propagates to one of the detectors 26, 28. A second neutron, illustrated by line 32, may make an initial collision, and create a gamma ray 36. Gamma ray 36 exemplifies that not all gamma rays created from the energy of the pulsed neutrons may proceed toward or be detected by the detectors 76, 28. As a neutron inelastically collides with other particles, its direction and energy may change, yet the neutron may still have sufficient energy to create additional gamma rays in secondary collisions. Line 38 illustrates a situation where a neutron has a first collision (creating gamma ray 36), and thereafter has a second collision to create gamma ray 40, which in this example may propagate towards one of the detectors.

As a neutron moves through the formation and interacts with various particles, it may lose energy until it reaches a low energy, on the order of 0.025 eV. When a neutron reaches this low energy, also known as thermal energy, it may be absorbed into a surrounding atom, and the absorption process may release a gamma ray. Dashed line 42 illustrates a neutron that has traveled into the formation and lost energy to the point that it reaches thermal energy, and is absorbed. The line 42 is dashed to exemplify that it is a resultant path, and the actual neutron path may vary wildly by having many inelastic collisions, before reaching the thermal energy state. The absorption of the neutron may create a gamma ray 44, which likewise may propagate towards and be detected by the detectors 26, 28, Gamma rays created by the capture of low energy neutrons may be referred to as thermal capture gamma rays.

Gamma rays created by the inelastic collisions are of primary interest in determining a density reading of a formation surrounding the logging tool. That is, characteristics of inelastic gamma rays may carry information as to the density of the formation investigated. The thermal capture gamma rays, by contrast, do not interact with the formation in such a way that density may be accurately determined by measuring their characteristics. Thus, in accordance with some embodiments of the invention, thermal capture gamma rays may be removed from the overall detected gamma rays prior to a density determination.

Logging tools constructed in accordance with embodiments of the invention may calculate a density based on the effects the density of the formation has on scattered gamma rays created during inelastic collisions. However, the inventor of the present specification has determined that accuracy of density readings based on the inelastic gamma rays is also affected by neutron transport characteristics of the formation. In other words, the interaction of the high energy neutrons with elements (such as in the casing or the formation) affect density readings calculated using back-scattered inelastic gamma rays. In order to overcome the effect of neutron transport in determining density, embodiments of the invention may compensate detected inelastic gamma rays for the neutron transport effects.

To elucidate the effects of neutron transport on density, the inventor modeled logging tool response as a function of porosity and density over a range of porosities and densities. In particular, using Monte Carlo analysis, or any suitable modeling system, logging tool response may be modeled at various porosities, such as 5, 10, 20, 30 and 40 porosity units (pu), and for density at ±0.2 grams per cubic centimeter (g/cc) around nominal density for each porosity. Modeling logging tool response over a range of possible porosity and density values allows for determining a sensitivity of inelastic gamma ray count rates to density substantially independent of neutron transport effects. In one illustrative model, a logging tool may have a near detector spacing of one foot and a far detector spacing of two feet. Further in the illustrative model, the number of high energy neutrons produced is known, e.g. $10^8$ high energy neutrons. Thus, count rates for each detector 26 and 28 as a function of neutrons produced may be modeled and compared. In alternative embodiments, ratios of detector count rates may be used to make the model substantially insensitive to the number of released neutrons.

Figure 2A:
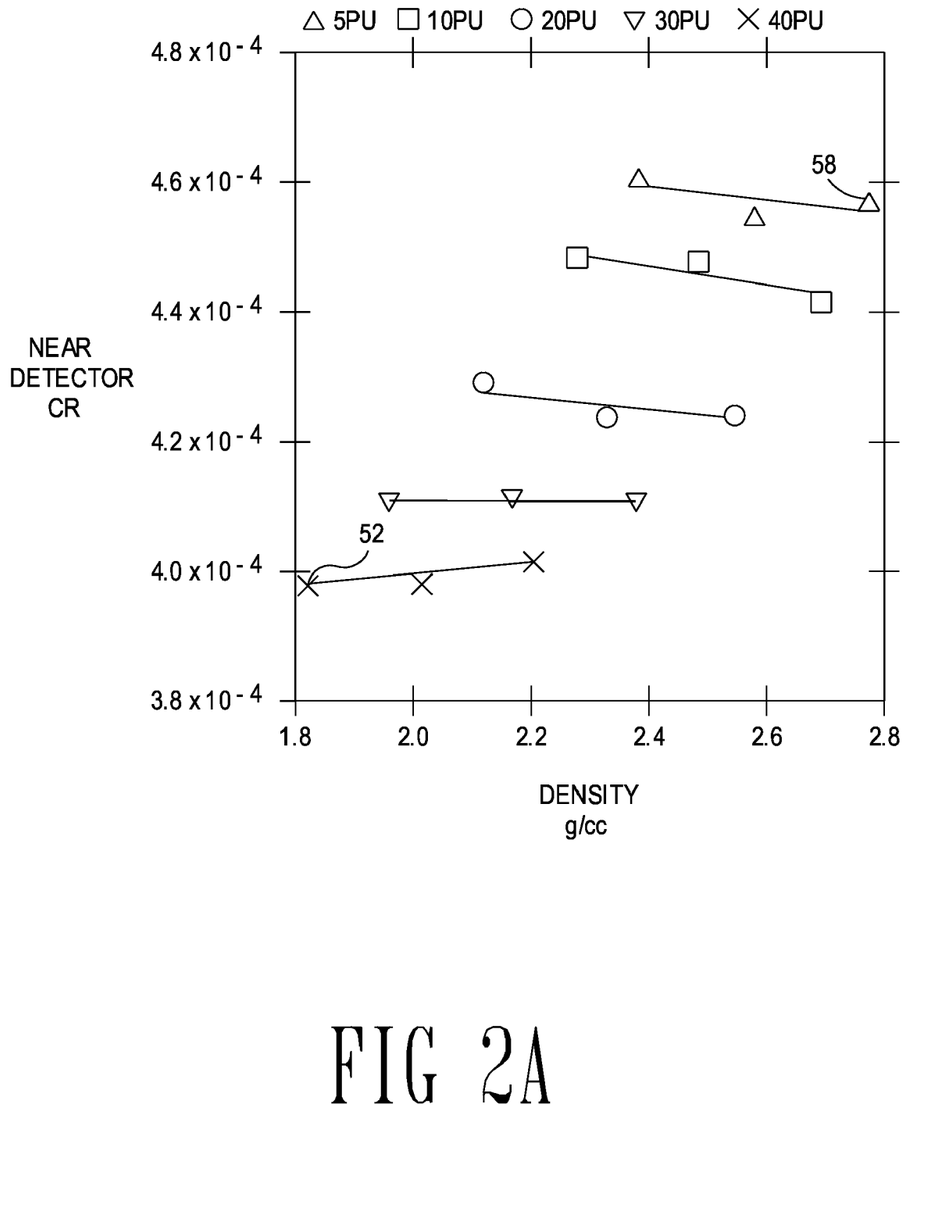
FIG. 2A illustrates inelastic gamma ray count rates of a modeled response for a near detector.

For the modeled ranges of density and porosity discussed above, FIG. 2A illustrates exemplary results of the analysis for the near detector. In particular, FIG. 2A illustrates near detector inelastic count rate (CR) on the ordinate, and density in g/cc along the abscissa axis. The count rate expressed in FIG. 2 may be a number of inelastic gamma rays detected by the modeled logging tool for each neutron produced in the model. Each line of the family of lines in the plot area of FIG. 2A represents a different modeled porosity at nominal (roughly in the middle of each line) and at ±0.2 g/cc from nominal for that porosity. FIG. 2A illustrates that for the particular spacing of approximately one foot between the high energy neutron source and the near detector, the inelastic gamma ray count rate for the near detector shows a positive correlation to porosity, and relatively little correlation to density.

Figure 2B:
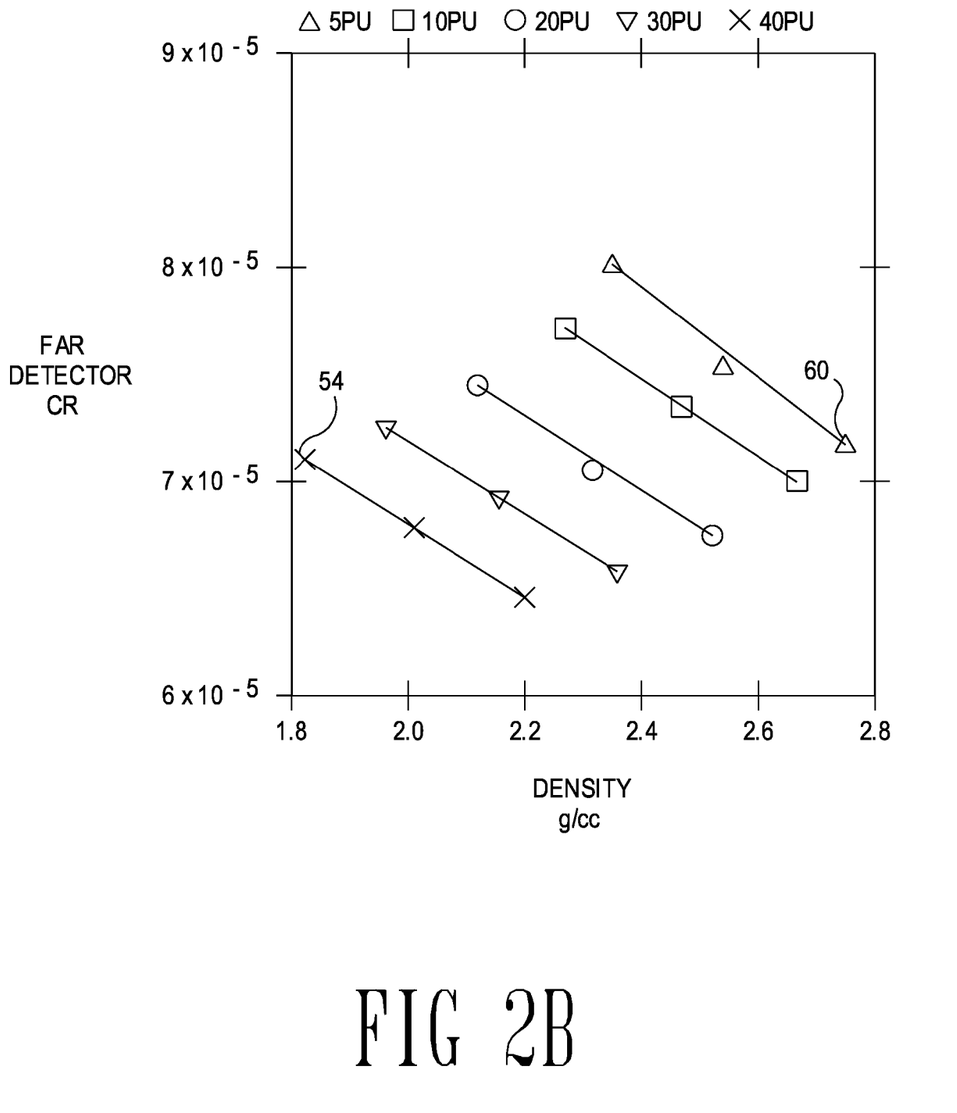
FIG. 2B illustrates inelastic gamma ray count rates of a modeled response for a far detector.

FIG. 2B illustrates a graph of the modeled response of the far detector inelastic gamma ray count rate to density for the same model parameters. As illustrated in FIG. 2B, the far detector inelastic gamma ray count rate shows a sensitivity to both porosity and density.

Figure 2C:
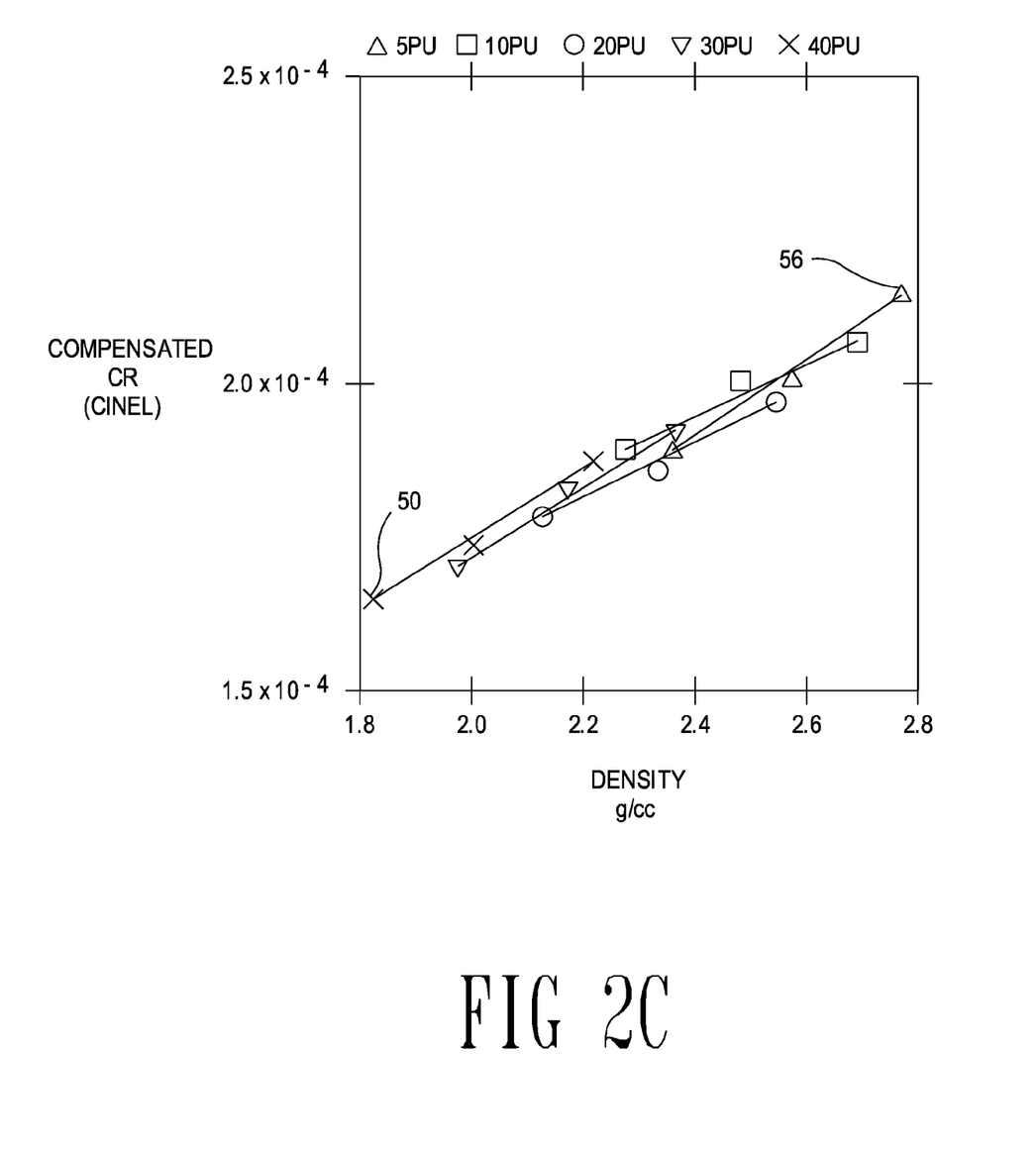
FIG. 2C illustrates inelastic gamma ray count rates of a modeled response after compensation for neutron transport effects.

In accordance with embodiments of the invention, a new measurement quantity is created from measured count rate values that is compensated for the neutron transport effects. More particularly, a compensated inelastic count rate may be created that is compensated for neutron transport effects. In at least some embodiments, the compensated inelastic count rate may be determined using substantially the following equation:

$$CINEL = NINEL - X*FINEL \quad (1)$$

where CINEL is a compensated inelastic count rate for a particular porosity and density, NINEL is a near inelastic count rate for the particular porosity and density (values of FIG. 2A), FINEL is a far inelastic count rate for the particular porosity and density (values of FIG. 2B) and X is a coefficient selected to substantially align the compensated inelastic count rate values across all the modeled porosity and density values. Stated otherwise, X may be selected to substantially remove neutron transport effects evidenced as porosity sensitivity. For the exemplary values illustrated in FIGS. 2A and 2B, X may equal 3.4, Applying equation (1) above to each of the points in FIGS. 2A and 2B may thus create a plurality of compensated inelastic count rate values as a function of density, as illustrated in FIG. 2C. Thus, for example, point 50 in FIG. 2C may be calculated as point 52 in FIG. 2A minus the result of 3.4 times the value of point 54 of FIG. 2B. Likewise, point 56 of FIG. 2C may be calculated as the value of point 58 of FIG. 2A minus the result of 3.4 times the value of point 60 in FIG. 2B. The value of the coefficient multiplied with the far detector inelastic count rate is merely exemplary, and may change depending on results of the model, which may be affected by parameters such as spacing between the neutron source and each of the receivers.

Figure 2D:
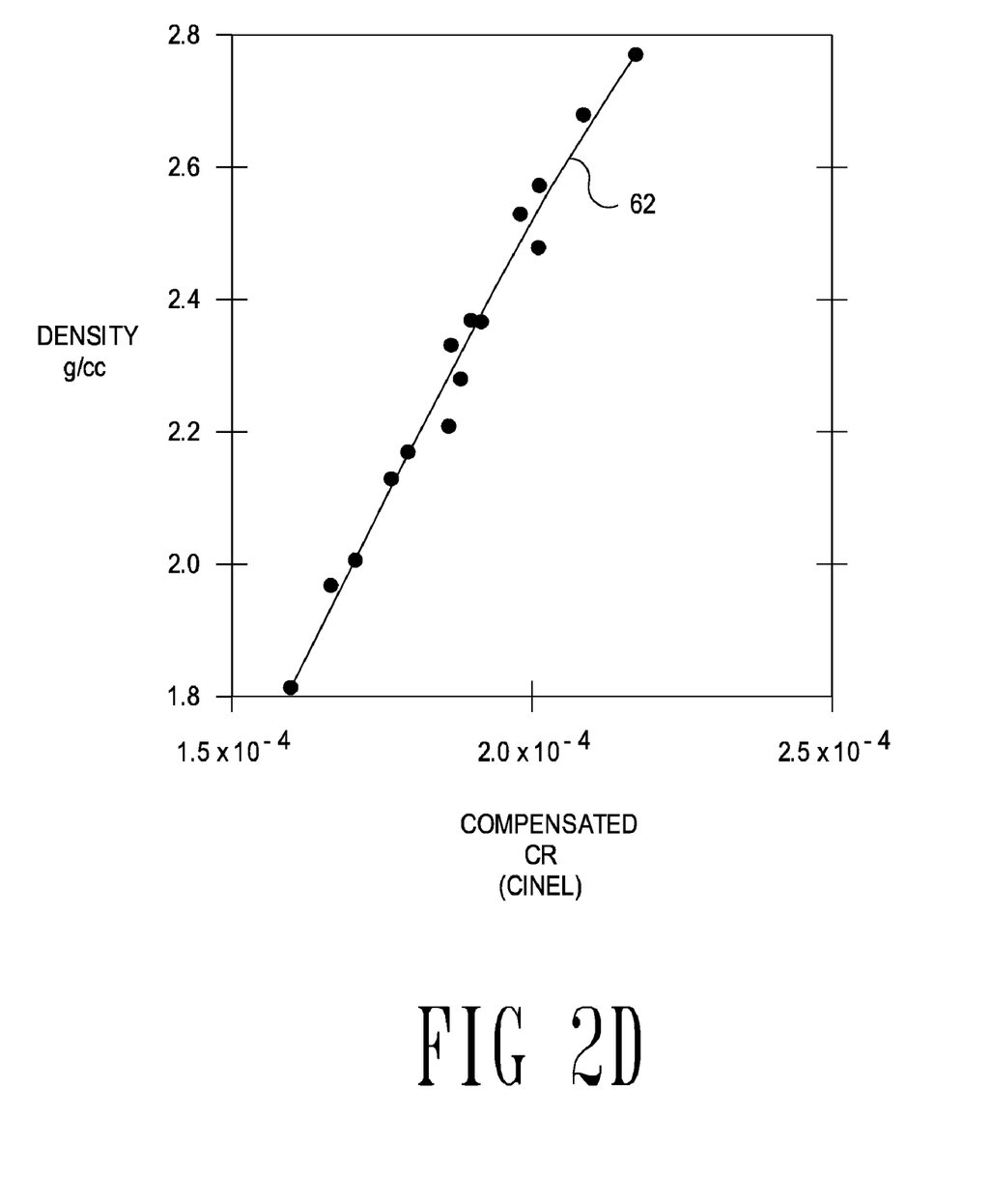
FIG. 2D illustrates the relationship between density and modeled compensated gamma gar count rates.

FIG. 2D illustrates the information illustrated in FIG. 2C with the abscissa and ordinate axes swapped, and with a curve-fitted line to the compensated inelastic count rate values. For the particular values of the model illustrated in FIGS. 2A-C, the line 62 that most closely approximates those values takes the form:

$$DENSITY = 3.27 \operatorname{Ln}(CINEL) + 30.37 \quad (2)$$

Thus, a density determination in accordance with embodiments of the invention follows a natural log of the compensated inelastic count rate. In a more general form, the relationship between the compensated inelastic count rate and the density for embodiments using count rates may be expressed as:

$$DENSITY = A * \operatorname{Ln}(CINEL) + B \quad (3)$$

where A and B are determined from curve fitting the compensated inelastic count rates determined from the model.

Once the coefficients X (from equation 1) and A and B from equation 3 are determined by modeling the tool response for a particular tool, the coefficients and the equations may be utilized in compensating actual inelastic count rates from a logging tool and determining density compensated for the neutron transport effects. That is, the logging tool 8 may be operated in an earth formation, and actual near and far detector count rates may be determined. Using coefficient X determined from modeling the logging tool response (the model run either before or after use of the logging tool in earth formation), an actual compensated inelastic count rate may be calculated. Using coefficients A and B determined from modeling the logging tool response (again, the model run either before or after use of the tool in earth formation), density may be determined using the actual compensated inelastic count rate and equation 3 above.

Figure 3:
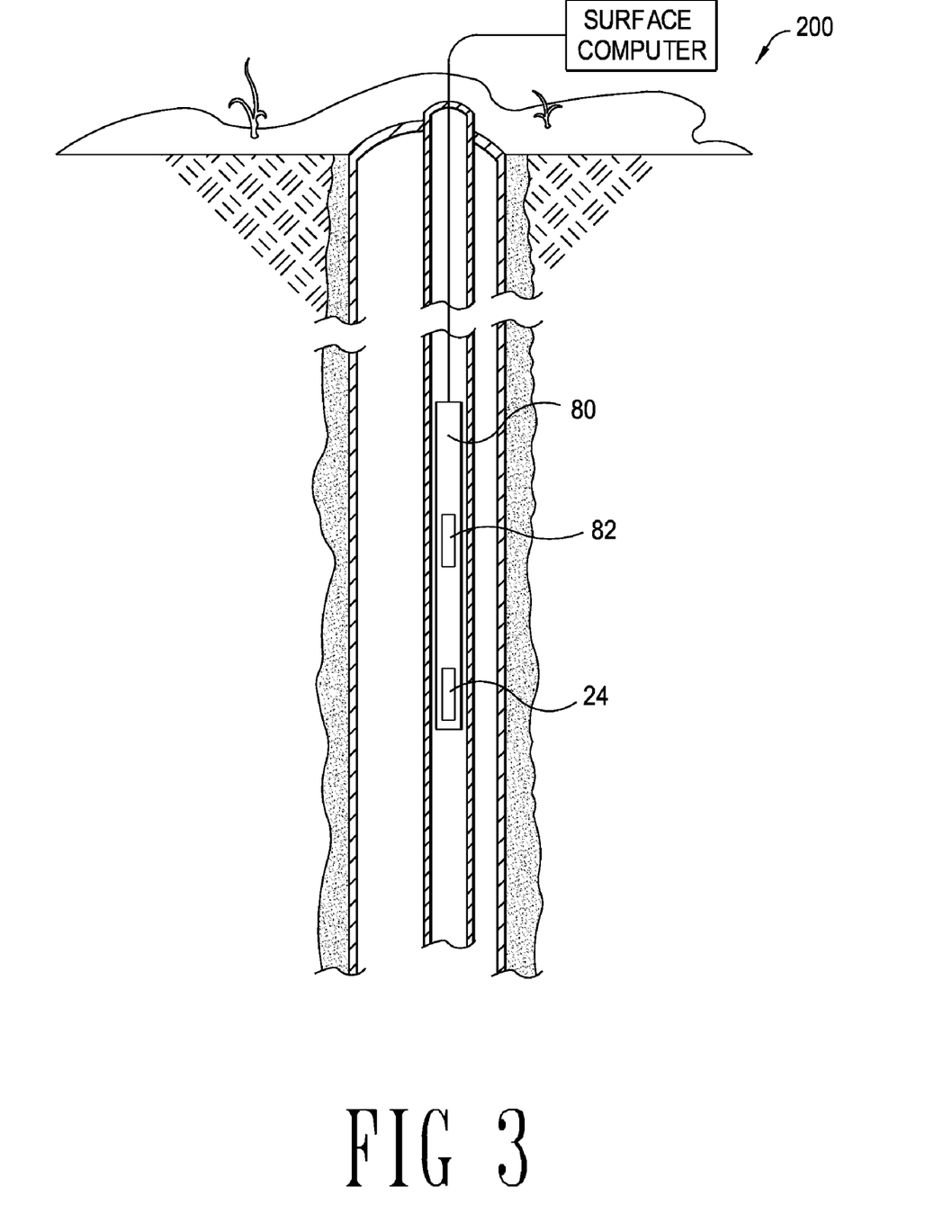
FIG. 3 illustrates a logging tool constructed in accordance with alternative embodiments of the invention.

FIGS. 2A and 2B illustrate modeled inelastic gamma ray count rates at various spacings from the neutron source. Any thermal capture gamma rays created in the model have been removed from the information illustrated in FIGS. 2A and 2B. Also, FIGS. 2A and 2B illustrate that density sensitivity is better with increasing neutron source to gamma ray detector distance. With these points in mind, FIG. 3 illustrates a logging system 200 in accordance with alternative embodiments of the invention. In particular, logging tool 80 may comprise a pulsed-neutron source 24, operable to generate neutrons having energies of approximately 14 MeV. Logging tool 80 may also comprise a single gamma detector 82 at a spaced-apart location from the neutron source 24. In accordance with the alternative embodiments of the invention, the spacing between the neutron source 24 and the receiver 82 may be of sufficient distance that the gamma rays received by the detector 82 show sensitivity to density in the surrounding formation. Thus, the spacing may be a little as approximately 17 inches, and preferably is on the order of approximately two to three feet.

In accordance with the alternative embodiments of the invention, the logging tool 80 response may be modeled using Monte Carlo analysis, or any suitable analysis program or system, for various assumed porosities (and for each assumed porosity, various assumed densities). What may be generated from the model may be a plot of inelastic gamma ray count rates as a function of density, similar to FIG. 2B. However, in the embodiments having only a single gamma ray detector, compensation for neutron transport effects may be based on parameters other than near detector inelastic count rates.

The inventor of the present specification has found that thermal capture gamma rays detected are indicative of the neutron transport effect. Thus, in embodiments having only a single gamma ray detector, compensated inelastic gamma ray count rates may be calculated using substantially the following equation:

$$CINEL = INEL - Y*TC \quad (4)$$

where INEL is the inelastic gamma ray count rate of the detector, TC is the thermal capture gamma ray count rate of the detector, and Y is a coefficient selected to make the compensated inelastic count rate (CINEL) substantially insensitive to neutron transport effects. Stated otherwise, Y may be selected from modeled responses to substantially remove neutron transport effects evidenced in the inelastic count rates as porosity sensitivity. Once the coefficient Y is determined from the modeled values, a characteristic equation relating the compensated inelastic gamma ray count rate to the density similar to equation 3 above may be determined. Thus, actual logging data, in particular inelastic gamma ray count rates, may be compensated by thermal capture gamma ray count rates (using the coefficient obtained from the model), and the formation density determined from the characteristic equation relating the compensated inelastic count rate to the density.

Embodiments illustrated by FIGS. 1 and 3 may produce at least a count rate as a function of the number of neutrons released by the source 24. In particular, the inelastic count rates determined for the exemplary model are count rates for each neutron released from the source 24. Thus, in some embodiments of the invention, the source 24 may be capable of either: producing a regulated or known number of high energy neutrons; or a counter or detector may be used to count or approximate the number of neutrons exiting the neutron source. In the case of a counter or detector, the detector may detect a number of neutrons exiting all or a part of a window where neutrons exit the neutron source 24.

In alternative embodiments of the invention, the neutron source 24, while being capable of producing high energy neutrons, may be unable to control the number of neutrons produced and/or may not be equipped to count or approximate the number of neutrons produced. Thus, detector count rates (as a function of produced high energy neutrons) may not be determinable. In alternative embodiments, rather than inelastic gamma ray count rates for near and far detectors, ratios of gamma rays detected at the near and far detectors may be used, as ratios may be substantially insensitive to actual neutron counts.

Figure 4A:
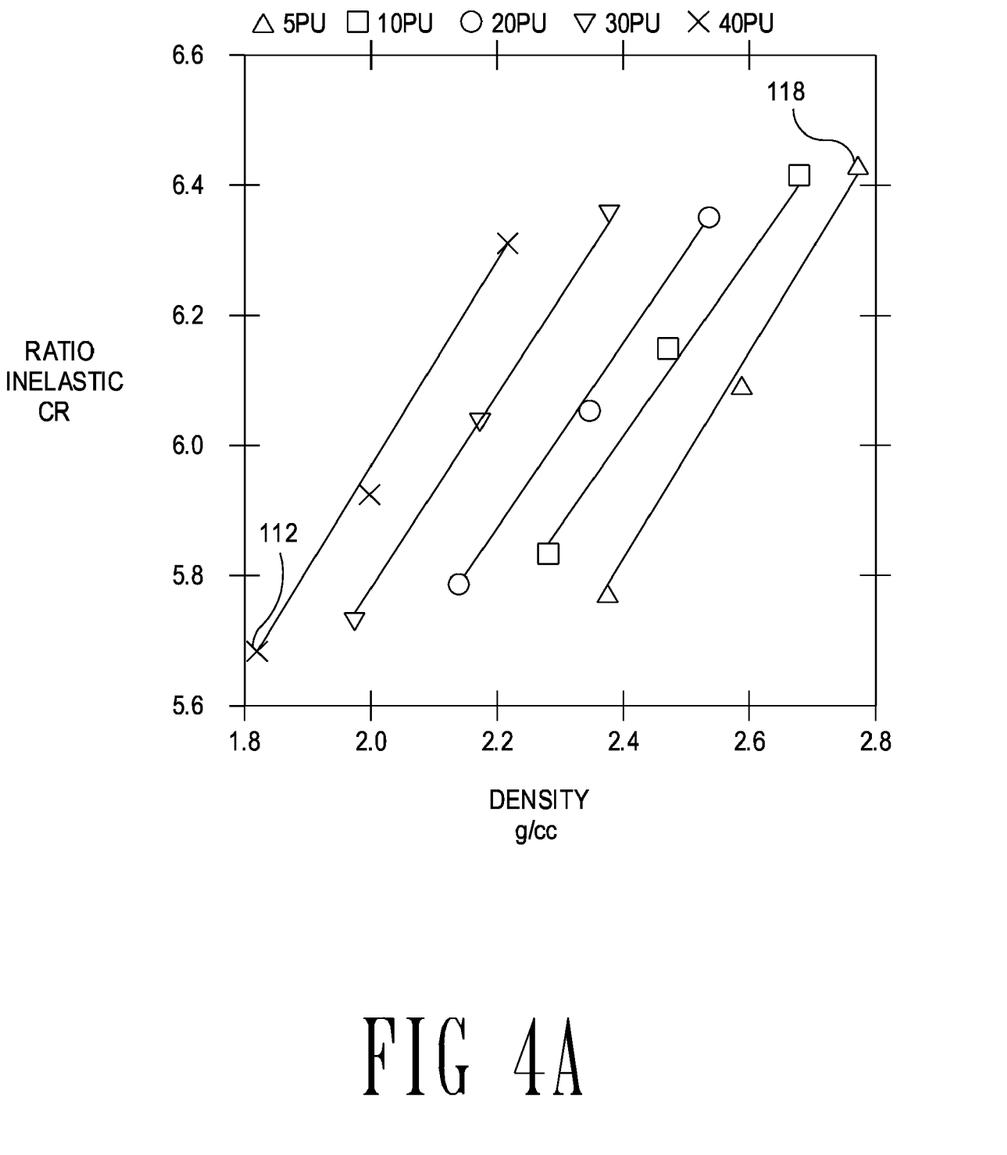
FIG. 4A illustrates a modeled ratio of inelastic gamma ray count rates.

Thus, in accordance with alternative embodiments of the invention, a Monte Carlo model, or similar analysis, may be run to model ratios of detected gamma rays for a logging tool having particular source to near and far detector spacings. A first ratio may be the ratio of inelastic gamma rays detected by the near and far detectors during the neutron burst. FIG. 4A illustrates a modeled response of the ratio of the near and far inelastic count rates for a plurality of assumed porosities (and for each assumed porosity, an assumed nominal density, ±0.2 g/cc). Thus, the family of lines (one each for each modeled porosity) shows a sensitivity of the ratios of the inelastic gamma ray count rates to density. The ratios also show some sensitivity to neutron transport, as evidenced by the separation between each line of the family of lines.

Figure 4B:
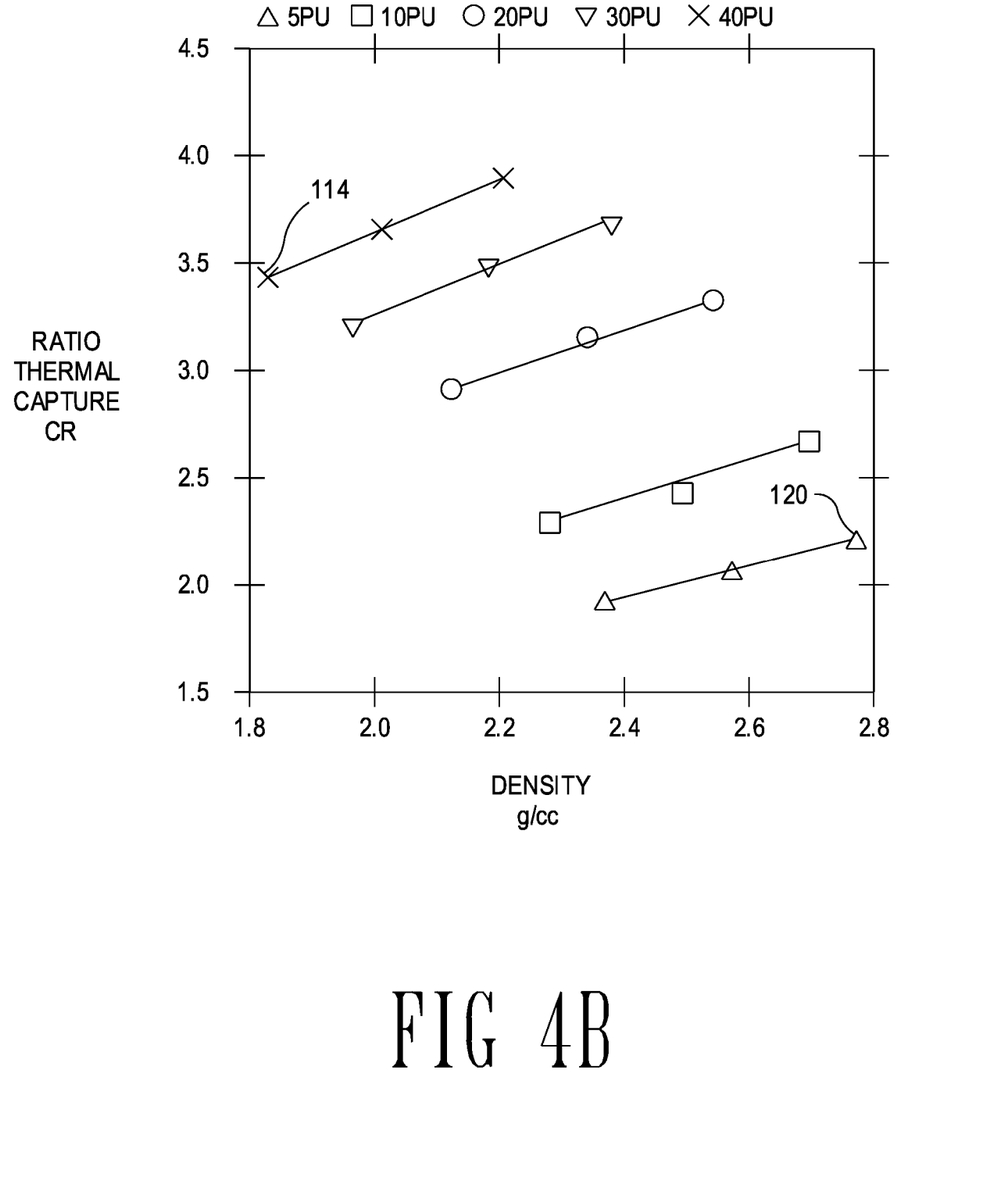
FIG. 4B illustrates a modeled ratio of thermal capture gamma ray count rates.

In embodiments where ratios of count rates are used, a second useful ratio may be the ratio of the count rates of thermal capture gamma rays detected at the near and far detectors between neutron bursts. FIG. 4B illustrates a family of lines for a modeled ratio of thermal capture gamma ray count rates generated using the assumed porosity and density values as discussed with respect to FIG. 4A. As illustrated in FIG. 4B, the ratio of thermal capture gamma ray count rate shows a correlation to density, but the strongest correlation is with respect to porosity. A compensated ratio may be determined, in this case using the ratio of the inelastic gamma ray count rate as illustrated in FIG. 4A and the ratio of the thermal capture gamma ray count rate as illustrated in FIG. 4B. In particular, the compensated ratio of the count rate in these embodiments may be determined using the substantially the following equation:

$$CRINEL = RIN - Z*RNF^K \quad (5)$$

where CRINEL is the compensated ratio of the inelastic gamma ray count rate, RIN is a ratio of the near and far inelastic gamma ray count rate, RNF is a ratio of the near and far thermal capture gamma ray count rate, IC is factor, and Z is a coefficient determined using the model which substantially aligns the compensated ratio of inelastic count rates. Stated otherwise, Z may be selected to substantially remove neutron transport effects evidenced in the ratio of inelastic count rates. The factor K may take any value, but as the gamma ray detectors are made preferentially sensitive to gamma rays from a particular direction (e.g., by way of shielding of the detector), the K factor tends to be a value other than one. In some embodiments with detectors preferentially sensitive to gamma rays from a particular direction, the K factor may be within the range $1 > K \geq 0.5$. More particularly, in embodiments with shielded gamma ray detectors the K factor may be within $0.75 > K \geq 0.5$.

Figure 4C:
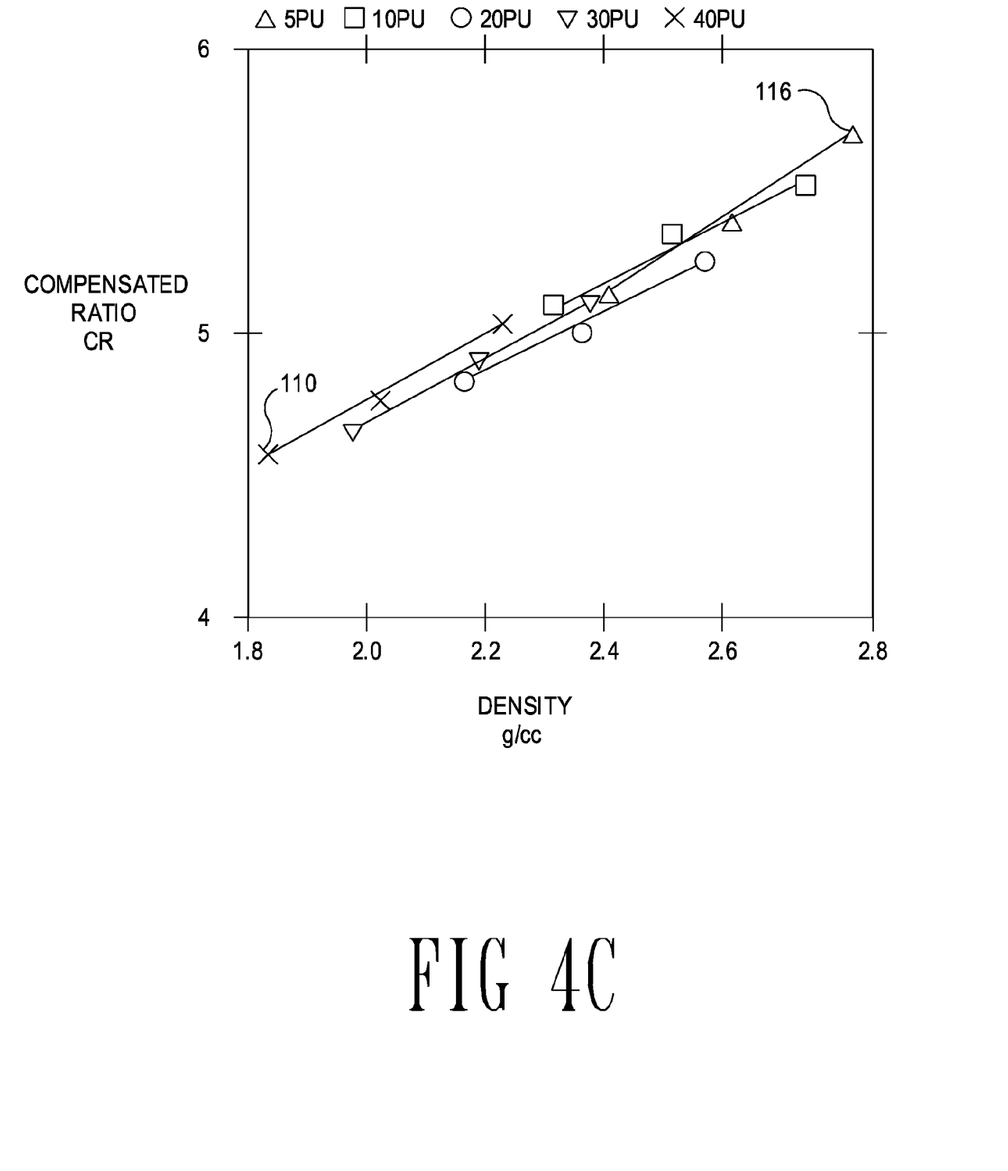
FIG. 4C illustrates a modeled ratio of inelastic gamma ray count rates after compensation for neutron transport effects.

FIG. 4C illustrates the compensated ratio of inelastic gamma ray count rates after application of equation 5 above (with the K factor being one). In particular, point 110 may be calculated as point 112 FIG. 4A) minus the result of 0.33 times point 114 (FIG. 4B). Likewise, point 116 may be calculated as point 18 (FIG. 4A) minus the result of 0.33 times point 120 FIG. 4B). As illustrated in FIG. 4C, application of equation 5 to each of the data points generated from the model, with an appropriate coefficient, may substantially align the various points. For the values modeled in FIGS. 4A and 4B, Z may be 0.33 and K may be one; however, having Z equal 0.33 and a IC being one is merely exemplary.

Figure 4D:
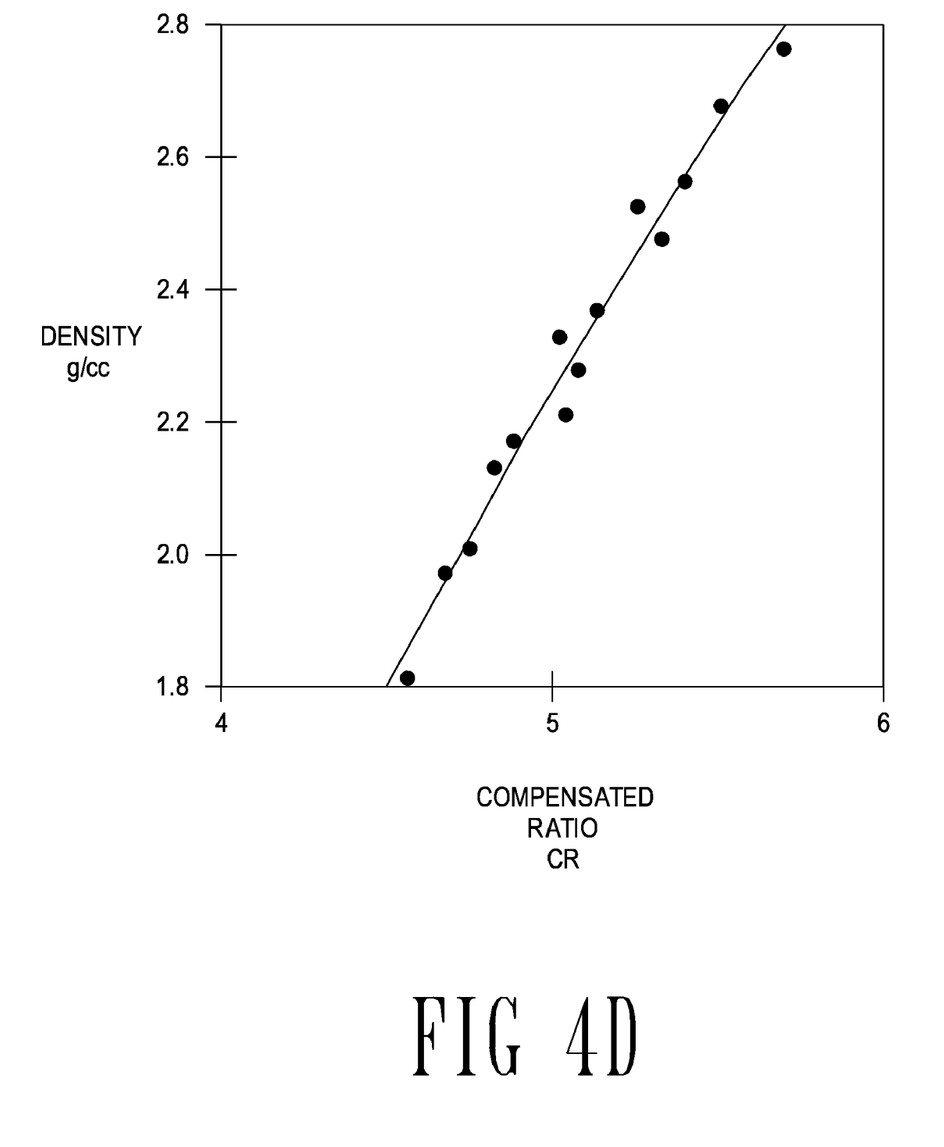
FIG. 4D illustrates a relationship between density and compensated ratio of inelastic gamma ray count rates in accordance with at least some embodiments of the invention.

FIG. 4D illustrates the compensated data points of FIG. 4C with the abscissa and ordinate axes swapped, and with a curved-fitted line through the compensated values. Much like the compensated inelastic count rate of FIG. 2D, the relationship between the density and the compensated ratio of the inelastic count rate of FIG. 4D takes substantially the form:

$$DENSITY = M*Ln(CRINEL) + N \quad (6)$$

For the particular simulation used to generate the FIGS. 4A-D, coefficient M may take a value of 4.25 and the coefficient N may take a value of −4.59.

Thus, a Monte Carlo, or similar analysis, may be run to determine the tool response for various assumed porosities. Once the ratio of the near and far inelastic gamma ray count rates, and the ratio of the near and far thermal capture gamma ray count rates are determined for the modeled parameters, the coefficient needed to create the compensated ratio of inelastic count rate may be determined (along with the coefficients of the characteristic equation). The logging tool may then be used in an actual formation to obtain a ratio of actual near and far inelastic count rates, and also to determine a ratio of actual near and far thermal capture gamma rays. Using the actual ratios and the coefficient Z determined in the modeling process, a compensated ratio may be created, which may be applied to equation 6 (along with the coefficients of equation 6 determined from the model) to calculate a density. Determining density in this manner, the neutron transport effects may be substantially reduced, thus increasing the accuracy of the density determination using a pulse-neutron logging tool.

The above discussion is meant to be illustrative of the principles and various embodiments of the present invention. Numerous variations and modifications will become apparent to those skilled in the art once the above disclosure is fully appreciated. For example, modeling tool response need not be performed prior to use of the logging tool in an actual formation. In fact the methods of compensating for neutron transport effects discussed herein may be used on existing data. Further, determining the coefficients of the equations may be accomplished from laboratory measurements (physical models), or even from field log measurements where a comparison density log is available. Although FIG. 1 illustrates a surface computer, any processor, regardless of its location, e.g. on the surface, within the sonde, or at a remote location, may be used. It is intended that the following claims be interpreted to embrace all such variations and modifications.

What is claimed is:
1. A method comprising:
   generating a plurality of neutrons;
   detecting gamma rays at a near gamma ray detector;
   detecting gamma rays at a far gamma ray detector;
   creating a compensated ratio count rate using ratios of an actual inelastic gamma ray count rate at the near and far detectors, ratios of an actual thermal capture gamma ray count rate at the near and far detectors, and a correction coefficient using the following equation:

$$CRINEL = RIN - Z*RNF^K$$

where CRINEL is the compensated ratio of the inelastic count rate, RIN is the ratio of the near and far inelastic count rate, RNF is the ratio of the near and far thermal capture gamma ray count rate, Z is the correction coefficient and K does not equal one.

2. The method as defined in claim 1 wherein creating further comprises creating the compensated ratio count rate where $1 > K \geq 0.5$.

3. The method as defined in claim 2 wherein creating further comprises creating the compensated ratio count rate where $0.75 \geq K \geq 0.5$.

4. The method as defined in claim 3 wherein the generating the plurality of neutrons further comprises generating the plurality of neutrons using at least one selected from the group: a chemical neutron source; and a neutron generator.

5. The method as defined in claim 1 further comprising:
    modeling ratios of inelastic gamma ray count rates for the near and far detectors;
    modeling ratios of thermal capture gamma ray count rates for the near and far detectors; and
    determining the correction coefficient from the models to create compensated modeled ratio count rates that are substantially free of neutron transport effects.

\* \* \* \* \*